(12) United States Patent
Matsuda

(10) Patent No.: US 7,643,165 B2
(45) Date of Patent: Jan. 5, 2010

(54) IMAGE FORMING DEVICE SYSTEM AND IMAGE FORMING DEVICE WITH FUNCTION RESERVATION FUNCTION

(75) Inventor: Masazo Matsuda, Osaka (JP)

(73) Assignee: Kyocera Mita Corporation, Osaka (JP)

(*) Notice: Subject to any disclaimer, the term of this patent is extended or adjusted under 35 U.S.C. 154(b) by 826 days.

(21) Appl. No.: 11/258,862

(22) Filed: Oct. 27, 2005

(65) Prior Publication Data

US 2007/0097407 A1 May 3, 2007

(51) Int. Cl.
G06K 15/00 (2006.01)
(52) U.S. Cl. .................. 358/1.15; 358/1.6; 358/1.13; 358/1.14; 399/81; 710/15; 715/734
(58) Field of Classification Search ....... 358/1.11–1.18; 399/81; 710/15; 715/700, 734–736
See application file for complete search history.

(56) References Cited

U.S. PATENT DOCUMENTS

| | | | |
|---|---|---|---|
| 6,266,151 B1 * | 7/2001 | Tachibana et al. ............ 358/1.4 |
| 6,307,640 B1 * | 10/2001 | Motegi ...................... 358/1.14 |
| 6,896,178 B2 * | 5/2005 | Hiramoto .................... 235/375 |
| 2002/0131059 A1 * | 9/2002 | Tsuchitoi .................... 358/1.1 |
| 2003/0014368 A1 * | 1/2003 | Leurig et al. ................. 705/64 |
| 2003/0086111 A1 * | 5/2003 | Akiyoshi .................... 358/1.14 |
| 2003/0117640 A1 * | 6/2003 | Parry et al. ................. 358/1.14 |
| 2003/0206311 A1 * | 11/2003 | Konsella et al. ............. 358/1.14 |
| 2003/0214667 A1 * | 11/2003 | Ishikura et al. ............. 358/1.13 |
| 2004/0012812 A1 * | 1/2004 | Shimizu .................... 358/1.15 |
| 2005/0094182 A1 * | 5/2005 | Reese et al. ................ 358/1.14 |

* cited by examiner

Primary Examiner—Kimberly A Williams
(74) Attorney, Agent, or Firm—Global IP Counselors, LLP

(57) ABSTRACT

When information is entered to make reservation with a PC for a desired function to be executed and conditions therefor among a plurality of functions of a multi-function machine, the multi-function machine displays marking information and the like for the purpose of selecting the function on the touch panel, and when the operator operates the corresponding marking information, the condition information is read from the PC, and the conditions are set in a way that allows the job to be executed with these conditions.

6 Claims, 4 Drawing Sheets

IMAGE FORMING DEVICE SYSTEM AND IMAGE FORMING DEVICE WITH FUNCTION RESERVATION FUNCTION

FIELD OF THE INVENTION

This invention relates to an image forming device system; in particular, it relates to an image forming device system having a personal computer (hereinafter abbreviated as PC) and an image forming device such as a multi-function machine having functions such as copier and facsimile, on a network line.

BACKGROUND INFORMATION

A multi-function machine, which is an example of image forming device, has functions built therein, such as copier, scanner, facsimile and printer; furthermore, it is connected to a network, allowing any of the functions of the multi-function machine to be selected by any of the PCs that are connected to the network, and executed.

With such multi-function machines, a plurality of functions cannot be executed simultaneously when used by a plurality of users, so that users must use the functions at different times. In addition, recent multi-function machines have enhanced job contents, and progress has been in multi-functionalization. For instance, image rotation process, frame removal, 2 in 1 output and the like can be set. For selecting such functions, setting is possible by operating the touch panel of the multi-function machine, but it takes time even for users that are fully used to the operation, during which time use by other users is limited.

For this reason, in order to use the multi-function machine efficiently, it is necessary to establish beforehand the order of the users that are going to use the machine. Thus, a technique to increase the efficiency of use is known, which allows use of the multi-function machine to be reserved by a user's PC. That is to say, the same screen as the operation unit of the multi-function device is displayed on the display unit of the PC, setting information for the multi-function device that the user wants to use is set in advance on the display screen, and when this multi-function device is to be used, a user ID is entered from the operation display unit to call up the setting information, thereby setting the function that the user wants to use.

With the multi-function machine described in the above technique, the operator must enter the user ID each time, so that operation is troublesome, and thus there was a demand for simple operations and the ability to verify simply that an operator has made a reservation.

Thus, an object of this invention is to provide an image forming device system that allows an operator to reserve the execution of a function with a simple operation.

SUMMARY OF THE INVENTION

This invention is an image forming device system, wherein a terminal device is connected through a line to an image forming device capable of executing a plurality of functions, the terminal device comprising an input means for entering information for reserving a desired function to be executed and conditions therefor among a plurality of functions in the image forming device, a storage means for storing condition information entered from the input means, a first communication means for communicating with the image forming device via a line, and a control means for transmitting through the first communication means to the image forming device, information indicating the desired function to be executed, which has been entered from the input means, while at the same time transmitting, in response to a request from the image forming device, information indicating the conditions stored in the storage means; the image forming device comprising an operation display unit for displaying information while being operated, a second communication means for communicating with the terminal device, and a control means for, in response transmission of information indicating the desired function to be executed from the terminal device through the second communication means, displaying on an operation display unit marking information corresponding to the terminal device where this information was entered, and, in response to any marking information displayed on the operation display unit having been operated, reads the information indicating the conditions stored in the relevant terminal device and sets the conditions in a way that allows the function to be executed with these conditions.

Preferably, the control means of the image forming device displays individual marking information that indicates the operator operating the relevant terminal device, and marking information indicating the relevant function, as marking information on the operation display unit.

Preferably, the input means of the terminal device comprises an instruction means that, when entering information pertaining to a reservation, instructs that confidentiality be maintained, the control means of the image forming device prohibiting reading of the information indicating the conditions that is stored in the terminal device if there is indication that the information on the desired function to be executed that has been entered be maintained secret.

Preferably, the image forming device releases the prohibition on information reading in response to the fact that identification information that identifies the relevant operator has been entered from the operation display unit.

According to this invention, when information on the reservation of a desired function to be executed and conditions therefor from among a plurality of functions in an image forming device is entered with the terminal device, the image forming device displays on the operation display unit marking information for selecting this function and the like; and when an operator operates the corresponding marking information on the operation display unit, condition information is read from the terminal device, and the job is executed with these conditions, resulting in an image forming device system that allows an operator to reserve the execution of a function with a simple operation.

DETAILED DESCRIPTION OF THE PREFERRED EMBODIMENTS

Figure 1:
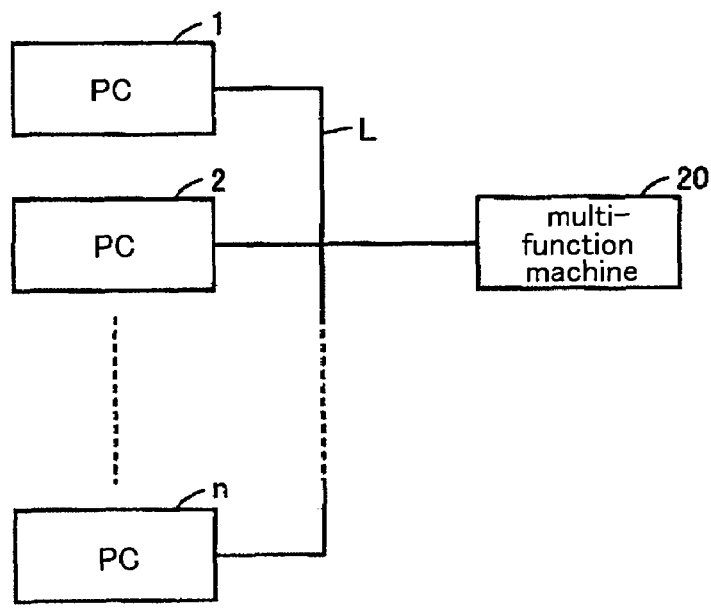
FIG. 1 is a schematic view showing a multi-function machine and a plurality of PCs connected via a network, which are comprised in an image forming system according to one embodiment of this invention.

FIG. 1 is an schematic view showing an image forming system according to one embodiment of this invention, FIG.

Figure 3:
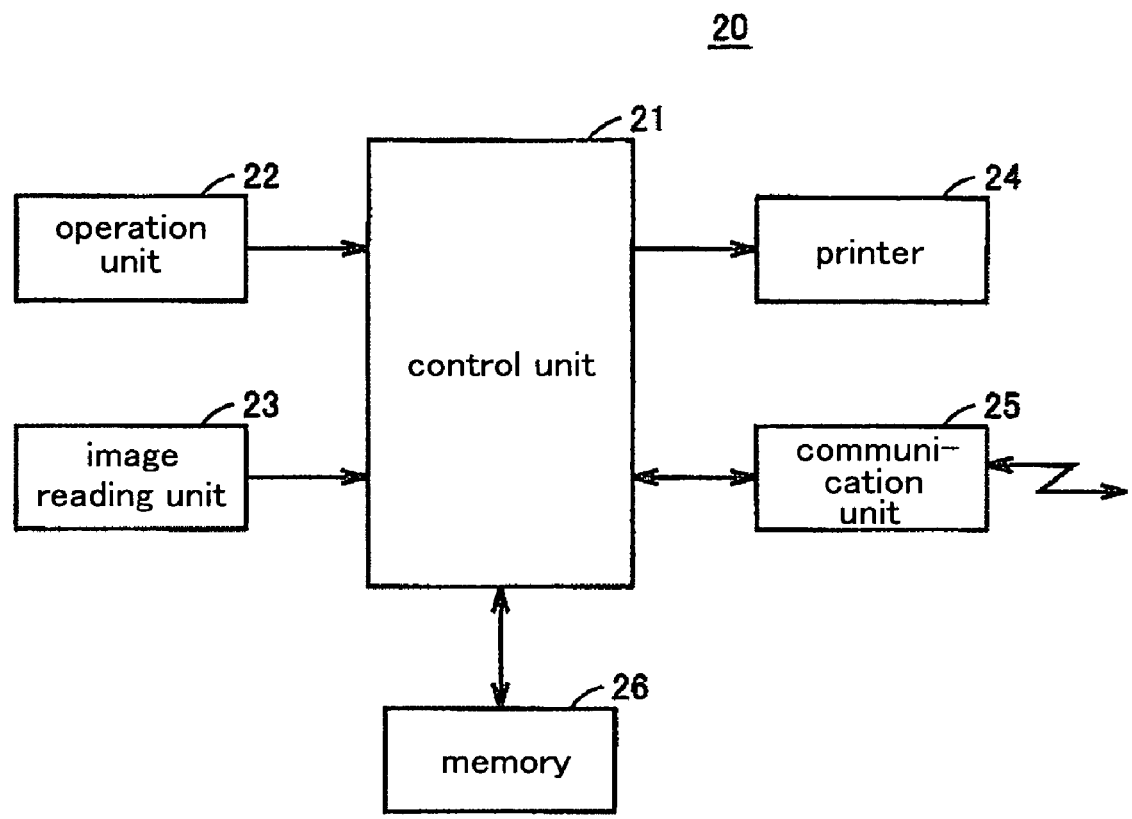
FIG. 3 is a schematic block diagram of a multi-function machine.

2 is a schematic block diagram of a PC and FIG. 3 is a schematic block diagram of a multi-function machine.

In FIG. 1, a plurality of PCs 1, 2 . . . n are connected to a multi-function machine 20 via a network line L. Operators, can use the PCs 1,2 . . . n to make a reservation to select any function among a plurality of functions that the multi-function machine 20 has, e.g., copier, scanner, facsimile and printer, and execute the function with any conditions. When this reservation is made, marking information corresponding to the reservation, such as an icon or a character, is displayed on the control panel of the multi-function machine 20.

The operator operates either of the PCs 1,2 . . . n to make a reservation, then operates the control panel of the multi-function machine 20 after a predetermined time elapses, and operates the icon corresponding to the operator's own reservation. In response, the multi-function machine 20 reads information on the conditions from the corresponding PC, and executes the process with these conditions.

Figure 2:
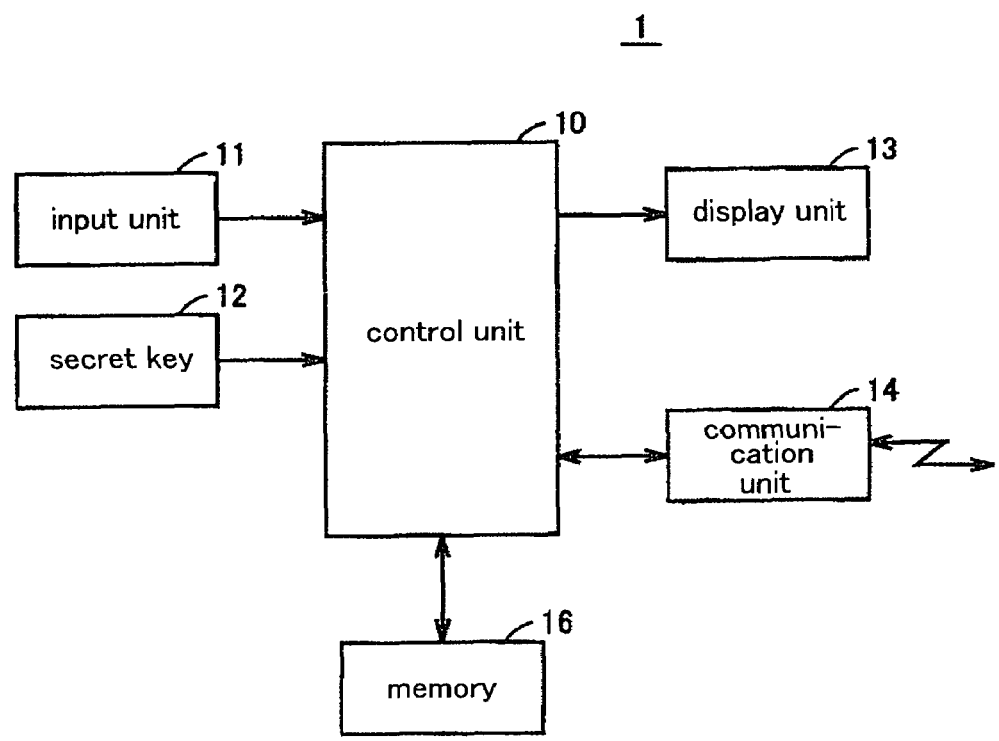
FIG. 2 is a schematic block diagram of a PC.

As shown in FIG. 2, PC 1 comprises an input unit 11, a secret key 12, a display unit 13, a communication unit 14 as a first communication means, and a memory 16, connected to a control unit 10. The input unit 11 is operated to reserve the desired function to be executed and conditions therefor among a plurality of functions in the multi-function machine 20, and secret key 12 is operated to maintain security when it is not desirable that the conditions entered with the input unit 11 be known to a third party. The communication unit 14 is connected to the network line L. The display unit 13 is capable of displaying the same information as the touch panel that sets the function and conditions of the multi-function machine 20. The memory 16 stores the conditions entered from the input unit 11. The other PCs 2 . . . n are constituted similarly to PC 1. As shown in FIG. 3, the multi-function machine 20 comprises an operation unit 22, an image reading unit 23, a printer 24, a communication unit 25, and a memory 26. The operation unit 22 comprises a touch panel or the like, and selects function and the like of the multi-function machine 20. The image reading unit 23 reads a document when the multi-function machine 20 is made to function as a copier, a scanner or a facsimile transmitter. The printer 24 prints data when the multi-function machine 20 is made to function as a facsimile receiver or a printer device. The communication unit 25 is connected to the network line L and communicates with the PCs 1,2 . . . n.

Figure 4:
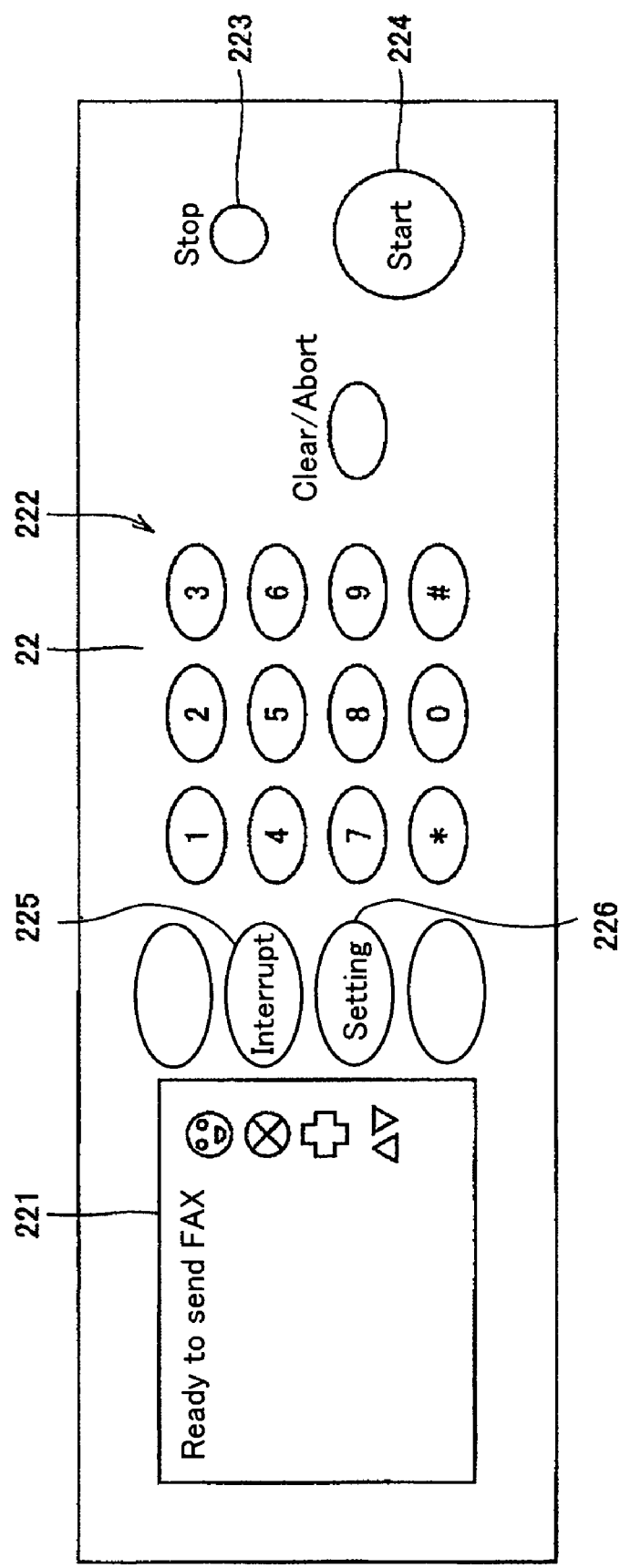
FIG. 4 is a view showing an operation unit of the multi-function machine shown in FIG. 3.

FIG. 4 is a view of the operation unit of the multi-function machine shown in FIG. 3. In FIG. 4, the operation unit 22 comprises a touch panel 221, a numeric keypad 222, a stop key 223, a start key 224, an interruption key 225 and a setting key 226. When operated, the touch panel 221 can select any among a copier, a scanner, a facsimile or a printer device, while at the same time, when a reservation has been made by PCs 1,2 . . . n, for selecting and executing with either condition, either function of the multi-function machine 20, i.e. copier, scanner, facsimile or printer device, it displays marking information for the information corresponding to the reservation, such as a character or an icon.

That is to say, a uniquely shaped icon indicating the face of the operator who made the reservation and an icon indicating the reserved function are displayed on the touch panel 221. The numeric keypad 222 enters the number of copies, or the recipient's phone number and the like when sending information via facsimile. The stop key 223 is operated to order that the job being executed be stopped, and the start key 224 is operated when ordering the execution of a job. The interruption key 225 orders the interruption of a job, and the setting key 226 is operated when setting conditions and the like.

Figure 5A:
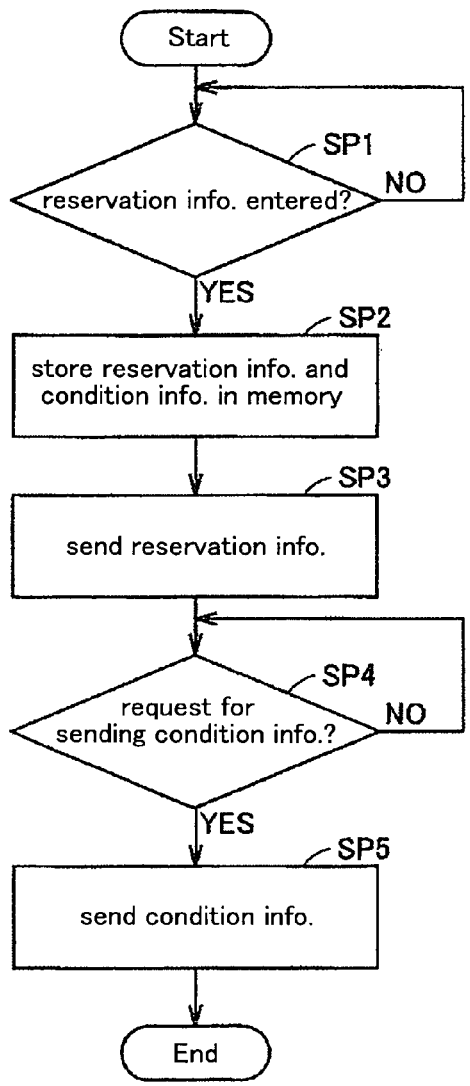
FIG. 5A-FIG. 5B are flowcharts for explaining the working of one embodiment of this invention.
Figure 5B:
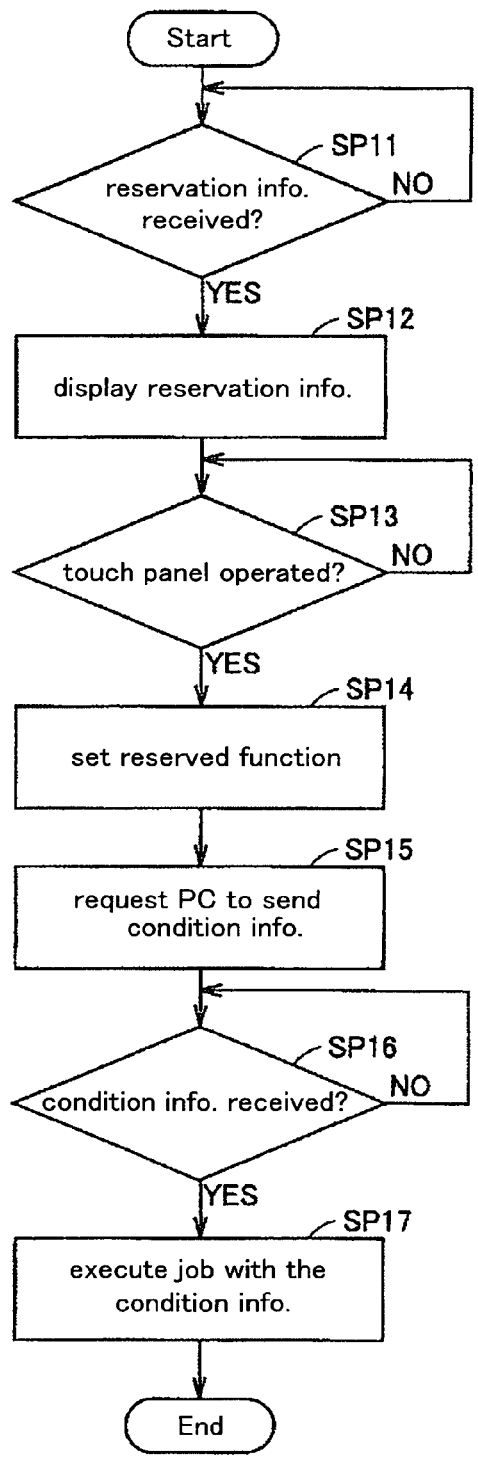

FIG. 5A to FIG. 5B are flowcharts for explaining the working of one embodiment of this invention; in particular, FIG. 5A shows the working of a PC and FIG. 5B shows the working of a multi-function machine.

Next, referring to FIG. 1 through FIG. 5A to FIG. 5B, the working of one embodiment of this invention will be explained.

It is assumed that an operator operates an input unit 11 of, for instance, a PC 1, and makes reservation for causing a multi-function machine 20 to function as a facsimile transmitter for transmitting data from a PC. At this moment, the same image as an operation unit 22 of the multi-function machine 20 is displayed on a display unit 13 of the PC 1. The operator looks at the display of the display unit 13, selects the facsimile transmission function as the function of the multi-function machine 20, and enters it as the reservation information.

In step (abbreviated as SP in the figures) SP1 shown in FIG. 5A, a control unit 10 assesses whether or not reservation information has been entered, and if entered, it causes memory 16 to store information pertaining to the reservation function and condition information in step SP2. If no reservation information has been entered in step SP1 it stands by until information is entered. Furthermore, in step SP3, the control unit 10 sends out information indicating that the facsimile transmission function has been reserved on the multi-function machine 20, via a communication unit 14, on a network line L.

In the multi-function machine 20, a control unit 21 assesses whether or not a communication unit 25 has received reservation information via the network line L in step SP11 shown in FIG. 5B, and if a reservation information has been received, it displays an icon indicating the operator who made this reservation and an icon indicating the reserved function on a touch panel 221 of an operation unit 22, in step SP 12. These displayed icons are chosen virtually and uniquely, so as to allow the operator who made the reservation to be identified, as shown in the touch panel 221 of FIG. 4. In addition, a message saying "ready for FAX transmission" is displayed.

The operator who made the reservation verifies that a character corresponding to the operator's own reservation is displayed on the touch panel 221 of the multi-function machine 20, then operates that character display corresponding to himself. The control unit 21 is assesses in step SP13 whether or not the touch panel 221 has been operated, and if it assesses that the touch panel 221 has been operated, it sets facsimile transmission, which is the reserved function, in step SP14. In step SP15, the control unit 21 requests the PC 1 via the communication unit 25 for transmission of condition information.

In PC 1, the control unit 10 assesses in step SP4 whether or not transmission of condition information is being requested from the multi-function machine 20, and if transmission of condition information is requested, reads the condition information from a memory 16 and sends it out via the communication unit 14 to the network line L, in step SP5. Herein, the condition information is the facsimile number of the recipient of the facsimile transmission, the data to be transmitted and the like.

In step SP16, the control unit 21 of the multi-function machine 20, assesses whether or not the condition information has been transmitted from PC 1, and if it assesses that the condition information has been transmitted, executes the job based on this condition information. That is to say, it transmits data with the facsimile number sent by the PC.

Note that when an operator wants to keep secret the fact that a facsimile transmission is performed, the operator operates the secret key 12 when entering the reservation information. When the control unit 10 of PC 1 assesses that the secret key 12 has been operated, it transmits the information that the condition information is secret to the multi-function machine 20; even if the touch panel 221 of the operation unit 22 is operated, the control unit 21 of the multi-function machine 20 does not carry out the corresponding process operation; security is maintained for instance by carrying out the relevant process only when the relevant operator enters an ID number or the like.

Note that, a reservation may be released if the operator does not operate the touch panel 221 of the multi-function machine 20 after a predetermined period of time has elapsed following making of the reservation with PC 1.

As described above, according to this embodiment, when information is entered to make reservations with PCs 1,2 . . . n for the desired function to be executed and conditions therefor among a plurality of functions in the multi-function machine 20, the multi-function machine 20 displays an icon to select this function on the touch panel 221, and when the operator operates the corresponding icon on the operation unit 22, condition information is read from the PC, and the job is executed with these conditions, resulting in an image forming device system that allows an operator to reserve the execution of a function with a simple operation.

In addition, when reservation information has been entered from each PC 1,2 . . . n, the condition information is stored in the memory by the PCs 1,2 . . . n, allowing the memory capacity of the multi-function machine 20 to be lower.

In the foregoing, an embodiment of this invention has been described with reference to figures; however this invention is not limited to the illustrated embodiment. Various modifications and variations can be applied to the illustrated embodiment within the same scope as, or an equivalent scope to, this invention.

What is claimed is:

1. An image forming device system, comprising:
   a terminal device connecting via a line to an image forming device that executes a plurality of functions,
   the terminal device including
      an input unit that enters information to reserve a desired function to be executed and conditions therefor among a plurality of functions in the image forming device,
      a storage unit that stores at least condition information entered from the input unit,
      a first communication unit that communicates with the image forming device via the line, and
      a control unit which transmits through the first communication unit to the image forming device, information indicating the desired function to be executed, which has been entered from the input unit, while at the same time transmitting, in response to a request from the image forming device, information indicating the conditions stored in the storage unit; and
   the image forming device including
      an operation display unit that displays information while being operated,
      a second communication unit that communicates with the terminal device via the line, and
      a control unit that in response to a fact that information indicating the desired function to be executed has been transmitted from the terminal device through the second communication unit, displays on the operation display unit marking information corresponding to the terminal device where this information was entered, and, in response to any marking information displayed on the operation display unit having been operated, reads the information indicating the conditions stored in the relevant terminal device and sets the conditions in a way that allows the function to be executed with these conditions,
   the control unit of the image forming device displays individual marking information that indicates an operator operating the relevant terminal device, and marking information indicating the relevant function, as the marking information on the operation display unit.

2. The image forming device system as recited in claim 1, wherein the input unit of the terminal device contains an instruction unit that, when entering information pertaining to a reservation, instructs that confidentiality be maintained,
   the control unit of the image forming device prohibits reading of the information indicating the conditions that is stored in the terminal device if there is indication that the marking information on the desired function to be executed that has been entered is to be maintained secret.

3. The image forming device system as recited in claim 2, wherein the image forming device releases a prohibition on information reading in response to the fact that identification information that identifies the relevant operator has been entered from the operation display unit.

4. An image forming device, comprising:
   an operation display unit that displays information while being operated;
   a communication unit that communicates with a terminal device; and
   a control unit that, in response to a fact that information indicating a desired function to be executed has been transmitted from the terminal device through the communication unit, displays on the operation display unit marking information corresponding to the terminal device where this information was entered, and, in response to any marking information displayed on the operation display unit having been operated, reads the information indicating conditions stored in the relevant terminal device and sets the conditions in a way that allows the function to be executed with these conditions,
   the control unit of the image forming device displays individual marking information that indicates an operator operating the relevant terminal device, and marking information indicating the relevant function, as the marking information on the operation display unit.

5. The image forming device as recited in claim 4, the control unit prohibits reading of the information indicating the conditions that is stored in the terminal device if there is indication that the marking information on the desired function to be executed that has been entered is to be maintained secret.

6. The image forming device as recited in claim 5, wherein the image forming device releases a prohibition on information reading in response to the fact that identification information that identifies the relevant operator has been entered from the operation display unit.

* * * * *